United States Patent
Jiang et al.

(10) Patent No.: US 10,219,157 B1
(45) Date of Patent: Feb. 26, 2019

(54) SECURE VERIFIED ATTRIBUTE EXCHANGE BETWEEN PARTIES IN PHYSICAL PROXIMITY

(71) Applicant: Symantec Corporation, Mountain View, CA (US)

(72) Inventors: Kevin Jiang, San Mateo, CA (US); Ilya Sokolov, Boston, MA (US)

(73) Assignee: SYMANTEC CORPORATION, Mountain View, CA (US)

( * ) Notice: Subject to any disclaimer, the term of this patent is extended or adjusted under 35 U.S.C. 154(b) by 274 days.

(21) Appl. No.: 15/286,424

(22) Filed: Oct. 5, 2016

(51) Int. Cl.
| | |
|---|---|
| *H04M 1/66* | (2006.01) |
| *H04W 12/08* | (2009.01) |
| *H04W 4/02* | (2018.01) |
| *H04W 12/06* | (2009.01) |
| *H04L 29/06* | (2006.01) |
| *H04M 1/68* | (2006.01) |
| *H04M 3/00* | (2006.01) |
| *H04M 3/16* | (2006.01) |

(52) U.S. Cl.
CPC .......... *H04W 12/08* (2013.01); *H04L 67/42* (2013.01); *H04W 4/023* (2013.01); *H04W 12/06* (2013.01)

(58) Field of Classification Search
CPC ......... H04W 4/00; H04W 4/026; H04W 4/20; H04W 4/30; H04W 4/38; H04W 4/50–4/80; H04W 8/18
See application file for complete search history.

(56) References Cited

U.S. PATENT DOCUMENTS

| | | | | |
|---|---|---|---|---|
| 8,646,060 | B1* | 2/2014 | Ben Ayed | H04L 63/0853 726/9 |
| 8,667,265 | B1* | 3/2014 | Hamlet | H04L 9/0866 326/80 |
| 2011/0047384 | A1* | 2/2011 | Jacobs | G06K 9/00221 713/176 |
| 2013/0101121 | A1* | 4/2013 | Nordholt | H04L 9/0852 380/279 |
| 2014/0106710 | A1* | 4/2014 | Rodriguez | H04M 1/7253 455/411 |
| 2016/0164849 | A1* | 6/2016 | Smith | H04L 63/0428 713/155 |
| 2016/0344559 | A1* | 11/2016 | Ma | H04L 9/3263 |

* cited by examiner

*Primary Examiner* — San Htun
(74) *Attorney, Agent, or Firm* — Patent Law Works LLP

(57) ABSTRACT

A first mobile device securely transmits selected verified attributes concerning the corresponding user to a second mobile device. The first device broadcasts verified, signed biometric information concerning its user, and the user's public key. The second device confirms the received broadcasted biometric information, based on sensor input. For example, sensors on the second device generate images of the first user, who is physically proximate, and information gleaned from the images is compared to broadcasted biometric information. In response to confirming the broadcasted biometric information, the second device transmits a request to establish a secure channel, and both devices generate a session key. The first device selects specific verified attributes to provide to the second device, based on context, policy and/or user directive. The first device then encrypts the attributes using the session key, and transmits them to the second device. The second device receives and decrypts the attributes.

20 Claims, 3 Drawing Sheets

SECURE VERIFIED ATTRIBUTE EXCHANGE BETWEEN PARTIES IN PHYSICAL PROXIMITY

TECHNICAL FIELD

This disclosure pertains generally to secure information sharing, and more specifically to secure verified attribute exchange between parties in physical proximity.

BACKGROUND

The digital age has not removed the need for regular, in person contact. Professionals, academics and others routinely travel to conferences, meet at special events such as business presentations or receptions, and speak to each other in public and private settings such as restaurants, coffee shops, ball games, parks, on the street, etc.

When people meet face to face, it is common to network and exchange information concerning their respective abilities, qualifications, experience, education, position, financial solvency, etc. However, when this information is simply exchanged verbally, there is no way for one party to know whether the other is being wholly truthful. Even where a party does not intended to be dishonest, people often exaggerate or are overly confident in their own abilities.

Certain conventional physical credentials such as government or corporate issued ids can be used to provide third party verification of some attributes. Unfortunately, information on such physical media is pre-printed, and cannot be redacted or selectively shared based on context. For example, when showing an id it is not possible to disclose only the employer, but not other information printed on the card, such as email address or phone number. In practice, people likely wish to share different information with different parties under different circumstances. Furthermore, the information printed on an id likely omits many attributes the owner might want to disclose, such as degrees earned or work history. People are unlikely to carry more detailed credentials such as transcripts or bank statements, which in any case present the same difficulties concerning selective sharing of content. Furthermore, physical credentials are typically not difficult to alter or forge.

It would be desirable to address these issues.

SUMMARY

Selected verified attributes are securely transmitted between mobile computing devices. For example, a first mobile computing device can securely transmit selected verified attributes concerning the corresponding user to a second mobile computing device over a secure channel. To do so, the first mobile computing device uses a supported short range wireless protocol such as Bluetooth to broadcast biometric information concerning its user, and the user's public key. The broadcasted biometric information concerning the user of the first mobile computing device has been verified and signed along with the user's public key by a trusted verification service. The broadcasted biometric information is discernable by visual and/or aural observation of the first user. These biometrics can be in the form of information concerning the user's physical appearance (e.g., eye color, hair style, height) and/or the user's voice (e.g., frequency). The specific biometric information to broadcast can vary depending upon the context or other factors. For example, visual characteristics could be broadcast in well-lit environments, whereas voice characteristics could be used when it is dark. Such biometric information is confirmable by the second, receiving mobile computing device by processing input gleaned from onboard optical and/or aural sensors.

In one embodiment, the first mobile computing device automatically detects, based on sensor input, that its user is engaged in an interaction with at least one other user, and in response starts broadcasting the signed verified biometric information and signed public key. The signal strength used for the broadcast can also be adjusted, in order to limit the area in which the biometric information is readable. In another embodiment, the first mobile computing device simply broadcasts this information by default, or when it is otherwise in an active state. Regardless, the second mobile computing device receives the broadcasted signed, verified biometric information concerning the user of the first mobile computing device, and the user's signed key. As with the broadcasting by the first mobile computing device, the second mobile device can monitor by default, or in response to an event, such as detecting its user engaging in an active conversation, based on sensor input.

The second mobile computing device confirms the received broadcasted biometric information concerning the user of the first mobile computing device, based on sensor input. For example, optical and/or aural sensors on the second mobile computing device generate images of the first user, who is physically proximate to and engaged in conversation or the like with the second user. More specifically, the second mobile device can take a photograph of the first user with an onboard camera, or record the user's voice with a microphone. The second mobile computing device can glean biometric information concerning the first user from such images, and compare that to the received broadcasted biometric information. Where the information gleaned from locally generated images matches the broadcasted biometric information received from the first mobile computing device, the second mobile devices confirms the broadcasted biometric information, in effect authenticating the user of the first mobile device.

In response to having confirmed the broadcasted biometric information, the second mobile device transmits a request to the first device to establish a secure channel for receipt of verified attributes concerning the first user. Both devices can use any secure protocol for creating a secure session, such as Transport Layer Security (TLS). Typically, both devices generate a session key to use for the secure connection. For example, in one embodiment, in order to generate the session key the second mobile device generates a random number, and uses the random number to generate the session key. The second mobile device then encrypts the random number with the first user's public key, and transmits the encrypted random number to the first mobile device, which decrypts the received random number using the first user's private key. The first mobile device then uses the decrypted random number to generate the session key. In another embodiment the two mobile devices use Diffie-Hellman key exchange to generate the session key.

The first mobile computing device selects specific verified attributes to provide to the second mobile computing device, from a set of available attributes concerning the first user which have been verified and signed by the verification service. In one embodiment, the first mobile device contextually determines the specific verified attributes to provide to the second mobile device, based on current physical location and/or identity of the target recipient. The first mobile device can also make the selection based on a policy and/or a directive received from the user. The first mobile device then encrypts the selected verified attributes using the session key, and transmits the encrypted verified attributes to the second mobile device. The second mobile device receives encrypted verified attributes concerning the first user, and decrypts them using the session key.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
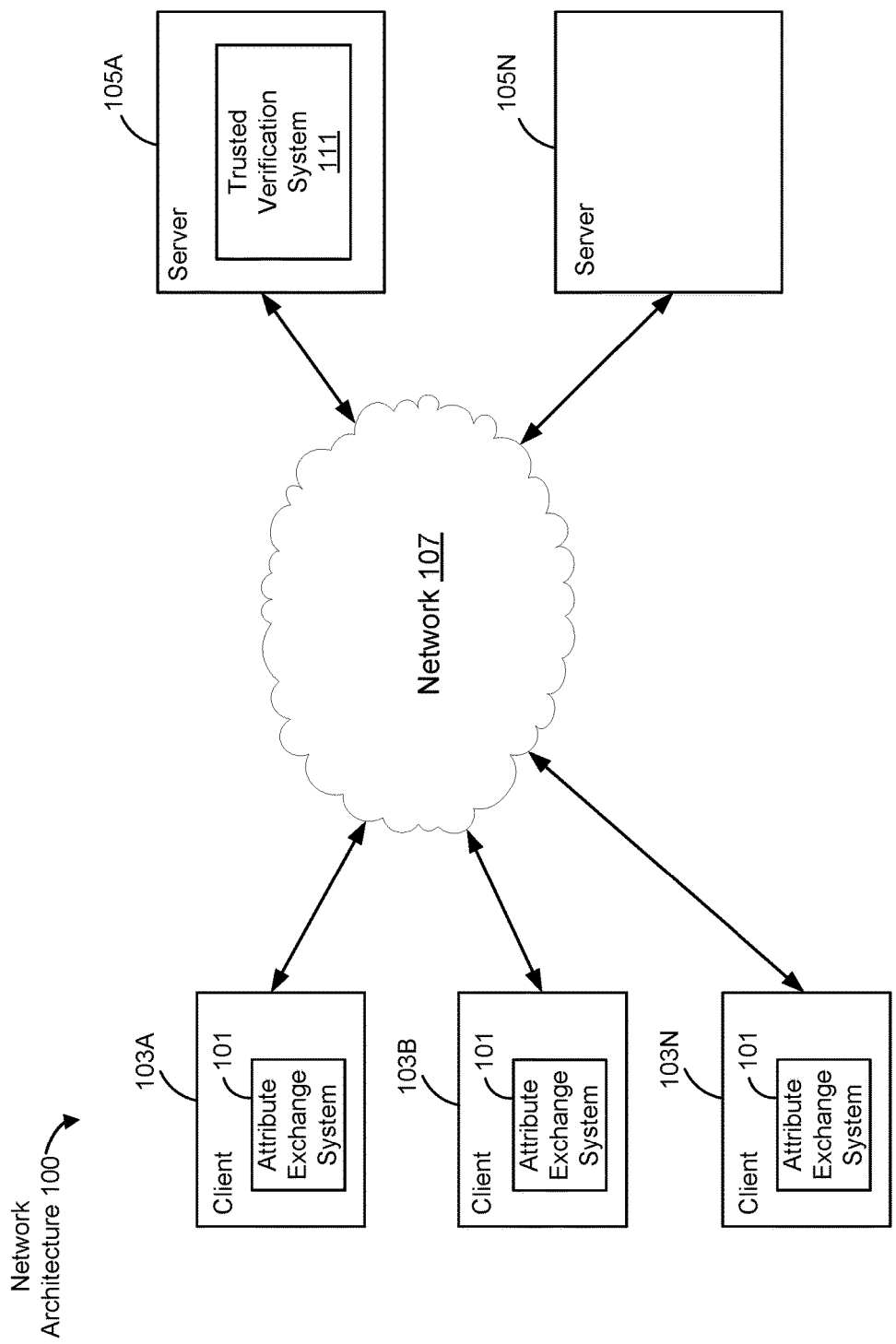
FIG. 1 is a block diagram of an exemplary network architecture in which an attribute exchange system can be implemented, according to some embodiments.

FIG. 1 is a block diagram illustrating an exemplary network architecture 100 in which an attribute exchange system 101 can be implemented. The illustrated network architecture 100 comprises multiple clients 103A, 103B and 103N, as well as multiple servers 105A and 105N. In FIG. 1, a separate attribute exchange system 101A-N is illustrated as residing on each separate client 103A-N, and a trusted verification service 111 is illustrated as residing on server 105A. It is to be understood that this is an example only, and in various embodiments various functionalities of this system 101 can be instantiated on a client 103, a server 105, or can be distributed between multiple clients 103 and/or servers 105.

Although FIG. 1 illustrates three clients 103 and two servers 105 as an example, in practice many more (or fewer) clients 103 and/or servers 105 can be deployed. In one embodiment, network 107 is in the form of a private enterprise level wide area network, although other networks (e.g., the internet,) can be used in other embodiments.

Clients 103 and servers 105 can be implemented using computer systems 210 such as the one illustrated in FIG. 3 and described below. The clients 103 and servers 105 are communicatively coupled to the network 107, for example via a network interface 248 or modem 247 as described below in conjunction with FIG. 3. Clients 103 are able to access applications and/or data on servers 105 using, for example, a web browser or other client software (not shown). Clients 103 can be in the form of desktop computers, laptop computers, or mobile computing devices 301, comprising portable computer systems capable of connecting to a network 107 and running applications. Some examples of mobile computing devices 301 are smartphones, tablets and wearable computing devices (e.g., smart watches, bracelets, glasses, badges, etc.).

Figure 2:
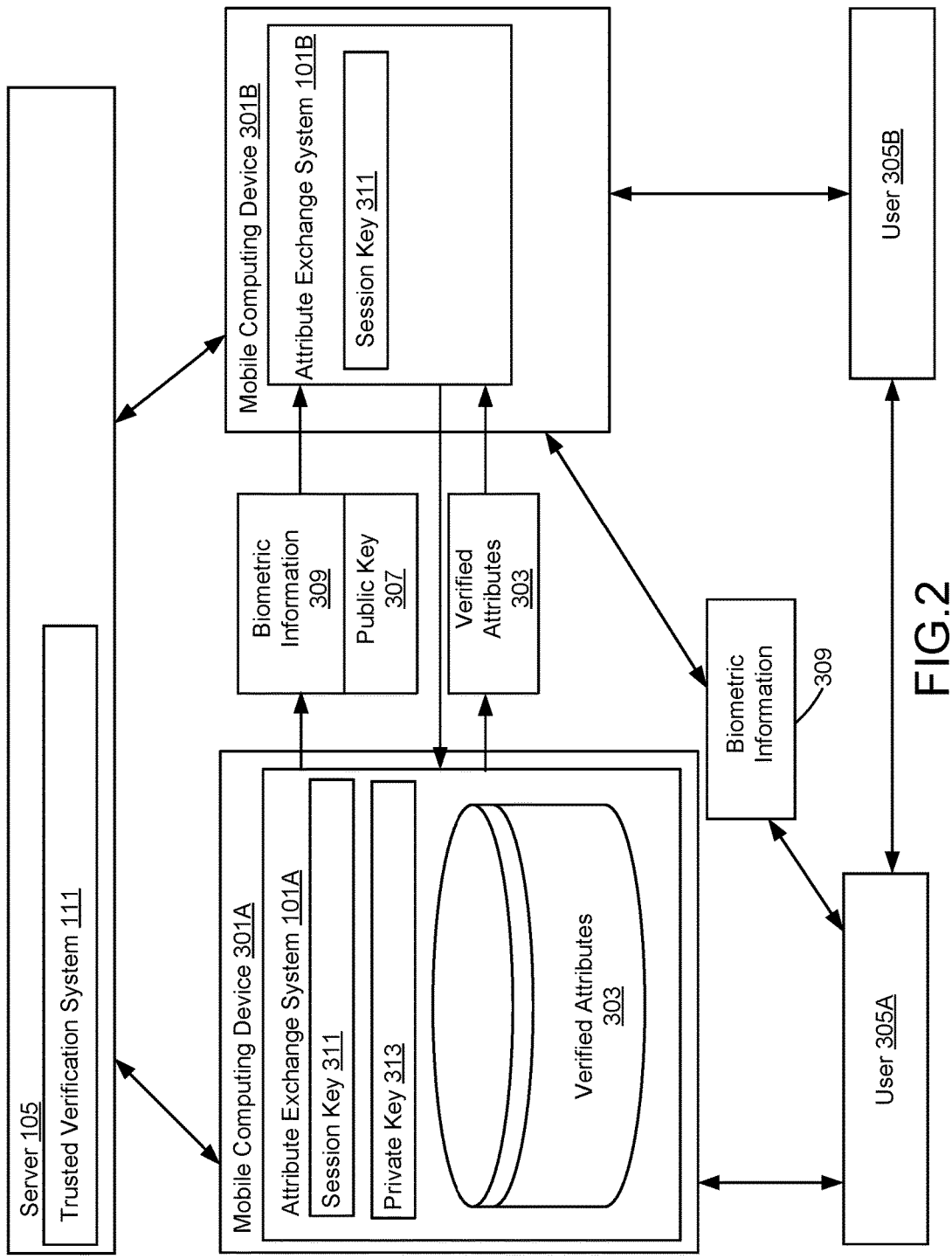
FIG. 2 is a block diagram of the operation of an attribute exchange system, according to some embodiments.

FIG. 2 illustrates the operation of an attribute exchange system 101, according to some embodiments. In FIG. 2, a separate attribute exchange system 101A-B is illustrated as residing on each of two separate mobile computing devices 301A-B, with a trusted verification service 111 running on a server 105. A first user 305A operates the first mobile computing device 301A, and a second user 305B operates the second mobile computing device 301B. As described above, the functionalities of the attribute exchange system 101 can reside on a client 103, a server 105, or be distributed between multiple computer systems 210, including within a cloud-based computing environment in which the functionality of the attribute exchange system 101 is provided as a service over a network 107. It is to be understood that although the attribute exchange system 101 is illustrated in FIG. 2 as a single entity, the illustrated attribute exchange system 101 represent a collection of functionalities, which can be instantiated as a single or multiple modules as desired (an instantiation of specific, multiple modules of the attribute exchange system 101 is illustrated in FIG. 2. In some embodiments, the different modules of the attribute exchange system 101 can reside on different computing devices 210 as desired. It is to be understood that the modules of the attribute exchange system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the attribute exchange system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 2, the attribute exchange system 101 enables the secure, contextual exchange of verified attributes 303 between parties, over a secure channel. In this day and age, most individuals carry or wear at least one mobile computing device 301, such as a smartphone, smart watch or other wearable device such as a smart bracelet or glasses, etc. Such mobile computing devices 301 support short range wireless protocols such as Bluetooth, Near Field Communication (NFC), infrared, Ant+, Zigbee, etc. As used herein, "short range" means a range of less than about ten meters. Theoretically, an attribute exchange system 101 on a source mobile computing device 301 could simply broadcast verified attributes 303 concerning the device's user 305 to all other mobile computing devices 301 within range, using a supported protocol such as Bluetooth. However, this would make the attributes 303 available indiscriminately, without regard to whether the user 305 wishes for the attributes 303 to be exposed to whomever happens to be monitoring or otherwise receiving Bluetooth transmissions. In order to avoid such compromises of privacy, the attribute exchange system 101 enables users 305 to transmit only select verified attributes 303 to specific target parties, based on context, policy and/or user directive, over a secure channel not subject to random eavesdropping.

To do so, each attribute exchange system 101 can broadcast signed verified biometric information 309 concerning the user 305 of the corresponding mobile device 301, along with the signed public key 307 of the user 305. The broadcasted biometric information 309 can include data concerning physical properties of the user 305. The specific biometric information 309 broadcasted is typically such that it can be confirmed by processing input gleaned from optical and aural sensors on mobile computing devices 301, such as the user's eye or hair color, voice frequency, height, body proportions, etc. In other words, an attribute exchange system 101 can broadcast biometric information 309 that is discernable by visual and/or aural observation of the user 305. The specific biometric information to broadcast can vary depending upon the context or other factors. For example, visual characteristics could be broadcast in well-lit environments, whereas voice characteristics could be used when it is dark, with the current illumination level being determined by the mobile computing device's ambient light sensor. This is just an example; the specific biometric information 309 to broadcast is a variable design parameter. Because the biometric information 309 that is broadcasted is also discernable by physically observing the user 301, this information is not secret to those within broadcast range, and hence does not compromise the user's privacy. In some embodiments, the attribute exchange system 101 also broadcasts other or different signed verified attributes 305 which the user does not mind disclosing to all those within range, such as an indication that the user 305 is, for example, a police officer or works for a given company. In other embodiments, an individual's public key 307 and/or biometric (or other) information 309 could be published via a QR code, for example on a badge (and scanned by smart glasses or a smart phone), or broadcasted in the direction that user 305 is facing.

The biometric information 309 being broadcasted is verified and signed by the trusted verification service 111. The trusted verification service 111 can be in the form of any party trusted to verify identities and other information concerning users 305, such as an established certificate authority (CA) or identity verification service. The role of the trusted verification service 111 is to verify the user's credentials and attributes 303, so that receiving parties can trust the information verified by the service 111. The trusted verification service 111 can use various standards and tests to confirm the user's identity and the accuracy of the user's attributes 303. The trusted verification service 111 then proclaims that the verified users 305 are who and what they say they are (e.g., the user's asserted identify and attributes 303 are accurate), and the trusted service 111 vouches that this is the case. In some embodiments, the trusted verification service 111 does so by issuing certificates to users 305 containing their public keys 307 and identities, as well as their verified biometric information 309 and attributes 303, signed by the trusted verification service 111. In other embodiments the verification service 111 provides signed public keys 307, identities, biometric information 309 and attributes 303 to verified users 305 in other formats. In some embodiments, the trusted verification service 111 can be in the form of an existing CA, such as Symantec, Comodo or GoDaddy. In other embodiments, the trusted verification service 111 can be in the form of a different trusted party, such as a service that performs user verification (identity proofing), and is capable of verifying various user attributes 303 for accuracy.

When two or more users 305 are in close physical proximity, their respective attribute exchange systems 101 can establish a secure channel and securely exchange verified attributes 303. For example, suppose the two users 305A-B illustrated in FIG. 2 are engaged in a conversation. The attribute exchange system 101A running on the first user's mobile computing device 301A broadcasts the first user's signed public key 307 and verified biometric information 309, and the attribute exchange system 101B running on the second user's mobile computing device 301B receives this data. As discussed below, both attribute exchange systems 101A-B can transmit and receive such data to and from each other. For clarity of explanation, this specification here describes the exchange originating from the first user's device 301AB to that of the second. In that scenario, the second user's attribute exchange system 101B confirms the received verified biometric information 309 concerning the first user 305A. Note that mobile computing devices 301 are typically equipped with optical and aural sensors, such as an ambient light sensor, cameras, a microphone, etc. The attribute exchange system 101B running on the second user's mobile computing device 301B processes and interprets input from these sensors on its mobile device 301B, and gleans biometric information 309 concerning the first user 305A to confirm that which is being broadcasted. For example, if the first attribute exchange system 101A on the first mobile computing device 301A is broadcasting biometric information 309 identifying the first user's hair color, hair style, ear shape and height, the receiving attribute exchange system 101B could take a photograph of the first user 305A, and interpret the photograph to independently learn and confirm this information 309. In some scenarios, the receiving attribute exchange system 101B can prompt its user 305B to aim the appropriate input device (e.g., the camera) at the target (e.g., user 305A to be photographed), for example where the mobile device 301 in question is a smartphone and its user 305B needs to hold it up to get an unobstructed face shot. In other scenarios, the mobile device 301B will naturally be properly positioned to obtain the desired sensor input, for example if the receiving device 301B is in the form of smart glasses and the users 305A-B are facing each other and engaged in conversation. Regardless, the second attribute exchange system 101B can utilize the appropriate sensor(s) or other input hardware on the corresponding mobile computing device 301B to capture the data it needs to learn the relevant biometric information 309. The second attribute exchange system 101B then compares the biometric information 309 it gleaned through scanning the first user 305A to that which was broadcasted by the first user's attribute exchange system 101A. Where the biometric information 309 matches, the second attribute exchange system 101B authenticates the first user 305A. This is so because the first user 305A is broadcasting verified biometric information 309 signed by the trusted service 111, which the receiving attribute exchange system 101B is able to independently confirm by scanning the user 305A in question, who is physically present. Different margins of error can be tolerated when matching broadcasted and scanned biometric information 309, to account for scanning imperfections and the like. What margin of error to tolerate, if any, is a variable design parameter. Once the broadcasting user 305A has been authenticated, the broadcasting user's signed public key 307 can be used to initiate session key exchange and establish a secure channel for transmission of verified attributes 303, as described in detail below.

Although the above paragraph describes a "first" and "second" user 305, attribute exchange system 101 and mobile computing device 301, it is to be understood that these ordinal labels are merely frames of reverence used for clarity of explanation. In practice, either or both attribute exchange systems 101 can transmit and/or receive signed verified biometric information 309, and/or scan, compare and confirm biometric information 309 to authenticate the other user 305. Furthermore, conversations and other interactions between more than two physically proximate people are common, and corresponding interactions between attribute exchange systems 101 on more than two mobile computing devices 301 are possible, as described in more detail below.

In some embodiments, an attribute exchange system 101 running on a user's mobile computing device 301 automatically detects when the user 305 is in a conversation or other close proximity human interaction. In response to such a detection, the attribute exchange system 101 can start broadcasting the user's biometric information 309 and public key 307, and/or monitor for corresponding broadcasts. In order to make such an automatic detection, sensors can register that a conversation or the like is occurring (e.g., smart glasses may register eye contact, a phone may classify and number voices, etc.). The signal strength at which to broadcast the information can be set based on the area in which it is desired that the signed biometric information 307 and public key 307 be readable, for example based on the physical distance between the users 305 as determined by the mobile device's proximity sensor. In other embodiments, attribute exchange systems 101 broadcast data and/or monitor for same as a default state when the system 101 is active, or in response to an input directive from the user 305.

Turning now to the actual secure exchange of verified attributes 303, suppose the second attribute exchange system 101B has verified the first user 305A by confirming that the scanned biometric attributes 309 match the corresponding verified ones broadcasted by the first user's mobile device 301A. In response to the second attribute exchange system 101B having thus confirmed the broadcasted biometric information 309 concerning the first user 305A, the second attribute exchange system 101B can transmit a request to the first attribute exchange system 101A to establish a secure channel. Both devices can use any secure protocol for creating a secure session, such as Transport Layer Security (TLS). Typically, both attribute exchange systems 101A-B generate a session key 311 to use for the secure connection. For example, in one embodiment, to generate a session key 311 to use for the secure connection, the second attribute exchange system 101B can encrypt a random number or the like with the first user's public key 307, and send the result to the first user's attribute exchange system 101A. The first attribute exchange system 101A can decrypt the random number using the first user's corresponding private key 313. Both attribute exchange system 101A-B can subsequently use the random number to generate a unique session key 311 for subsequent encryption and decryption of data during the session. Other techniques can be used to generate session keys 311 in different embodiments as desired, such as Diffie-Hellman key exchange, use of a hash based session key derivation scheme such as the CryptDeriveKey function, etc. Regardless, the first attribute exchange system 101A can use the session key 311 to encrypt verified attributes 303 concerning its user 305, and securely transmit them to the second attribute exchange system 101B, which can decrypt them using the session key 311. Provided that the first user's private key 313 remains truly private, the communication is secure. In different embodiments, new session keys 311 can be generated at varying frequencies as desired for enhanced security. In one embodiments, a different session key 311 may be used for each message.

Once a secure channel is established as described above, the first attribute exchange system 101A can securely transmit selected verified attributes 303 to the second attribute exchange system 101B. The first attribute exchange system 101A can select specific verified attributes 303 to provide to the second attribute exchange system 101B from a set of available verified attributes 303. Which specific verified attributes 303 to share with the target party can be determined contextually, based on factors such as the type of event at which the parties are in contact (e.g., convention, conference, meal, random meeting, etc.), the current physical location (e.g., on the premises of a given company, in a public place, etc.), the identities of the parties present (e.g., target recipients), etc. An attribute exchange system 101 can discover such information in a variety of ways, for example using the global positioning system receiver on the mobile computing device 301, examining identifying information (e.g., an IP address) concerning at least one computing device associated with a currently accessible wireless network 109 (e.g., a local network host), etc. Which specific verified attributes 303 to share with which target parties in which contexts is a variable design parameter. In some embodiments, an attribute exchange system 101 can select verified attributes 303 to provide to a target party based on a policy, which specifies terms and conditions according to which to exchange such information with other parties. Such contextual sharing decisions and policies can be at any level of granularity as desired. It is also possible for a given attribute exchange system 101 to transmit specific verified attributes 303 to a given target party in response to a directive from the corresponding user 305, entered, for example, via a user interface. In turn, verified attributes 303 received by an attribute exchange system 101 can be displayed to the receiving user 305, for example on the screen of a pair of smart glasses, on the display of a smart watch or smartphone, etc. The receiving user 305 can also store or otherwise process these attributes 303 as desired. Because the received verified attributes 303 are signed by the trusted verification service 111, the receiving party can be confident that they are accurate and legitimate. Thus, parties are able to securely exchange only desired specific verified attributes 303, based on location or conversational context, target party, policy, user selection, etc.

As noted above, multiple parties operating separate mobile computing devices 301 each running an attribute exchange system 101 can simultaneously authenticate each other and exchange verified attributes 303 as desired. For example, where three users A, B and C are engaged in a three way conversation, each party's attribute exchange system 101 can transmit select verified attributes 303 to only those other parties specified by context, policy, user directives, a combination of these factors, etc. For example, user A could share a set of verified attributes 303 specified by user A's default policy with both user B and user C, while user B shares some attributes 303 with user A but none with user C, based on the current context and the identities of the respective parties, while user C could specify via user interface to share one set of verified attributes with user A and a different set with user B. Of course, these are just examples.

Figure 3:
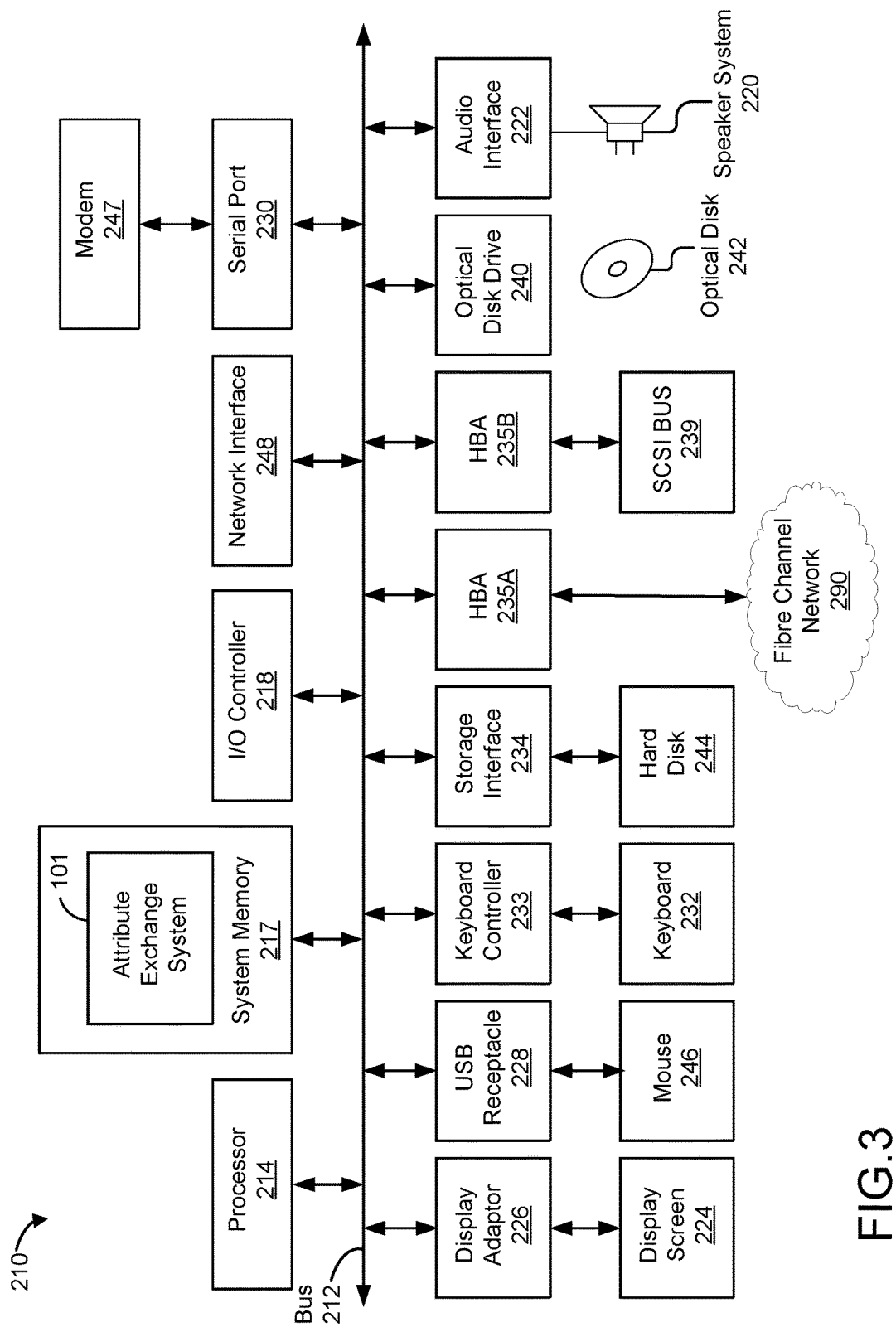
FIG. 3 is a block diagram of a computer system suitable for implementing an attribute exchange system, according to some embodiments.

FIG. 3 is a block diagram of a computer system 210 suitable for implementing an attribute exchange system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) receptacles 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB receptacle 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB receptacles 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the attribute exchange system 101 is illustrated as residing in system memory 217. The workings of the attribute exchange system 101 are explained in greater detail above in conjunction with FIG. 2.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for securely transmitting selected verified attributes between a first mobile computing device having a first user and a second mobile computing device having a second user over a secure channel, the method comprising the steps of:

broadcasting, by the first mobile computing device, biometric information concerning the first user, the broadcasted biometric information being independently confirmable by visual and/or aural observation of the first user, the broadcasted biometric information having been verified and signed by a verification service separate from the first mobile computing device and the second mobile computing device;

broadcasting, by the first mobile computing device, a public key of the first user, the public key having been signed by the verification service;

receiving, by the first mobile computing device from the second mobile computing device, a request to establish a secure channel for transmission of verified attributes, in response to the second mobile computing device having confirmed the broadcasted biometric information concerning the first user;

generating a session key based on the broadcasted public key, by the first mobile computing device;

selecting, by the first mobile computing device, specific verified attributes to provide to the second mobile computing device, from a set of available verified attributes concerning the first user, the set of available verified attributes concerning the first user having been verified and signed by the verification service;

encrypting the selected verified attributes using the session key, by the first mobile computing device, the selected verified attributes further comprising verified attributes of at least one type from a group of types consisting of:
  verified attributes based on current physical location;
  verified attributes based on identity of at least one target recipient;
  verified attributes based on policy specifying terms and conditions according to which to exchange information;
  verified attributes based on a directive received from the first user; and transmitting the encrypted verified attributes to the second mobile computing device, by the first mobile computing device.

2. The method of claim 1 wherein broadcasting biometric information concerning the first user that is discernable by visual and/or aural observation further comprises:

broadcasting biometric information concerning the first user that is confirmable by processing input gleaned from optical and/or aural sensors on a mobile computing device.

3. The method of claim 1 wherein broadcasting biometric information concerning the first user that is discernable by visual and/or aural observation further comprises:
  broadcasting biometric information concerning the first user's physical appearance.

4. The method of claim 1 wherein broadcasting biometric information concerning the first user that is discernable by visual and/or aural observation further comprises:
  broadcasting biometric information concerning the first user's voice.

5. The method of claim 1 wherein broadcasting biometric information concerning the first user and broadcasting the public key of the first user further comprises:
  automatically detecting, by the first mobile computing device based on sensor input, that the first user is engaged in an interaction with at least one other user; and
  in response, broadcasting, by the first mobile computing device, the first user's signed verified biometric information and signed public key.

6. The method of claim 1 wherein broadcasting further comprises:
  transmitting according to a short range wireless protocol.

7. The method of claim 1 wherein generating a session key, by the first mobile computing device, further comprises:
  receiving, by the first mobile computing device from the second mobile computing device, a random number encrypted with the first user's public key;
  decrypting the received random number using a corresponding private key of the first user, by the first mobile computing device; and
  using the decrypted random number to generate a unique session key.

8. The method of claim 1 wherein generating a session key, by the first mobile computing device, further comprises:
  using Diffie-Hellman key exchange.

9. The method of claim 1 wherein selecting specific verified attributes to provide to the second mobile computing device further comprises:
  contextually determining specific verified attributes to provide to the second mobile computing device, by the first mobile computing device, based on current physical location.

10. The method of claim 1 wherein selecting specific verified attributes to provide to the second mobile computing device further comprises:
  contextually determining specific verified attributes to provide to the second mobile computing device, by the first mobile computing device, based on identity of at least one target recipient.

11. The method of claim 1 wherein selecting specific verified attributes to provide to the second mobile computing device further comprises:
  selecting, by the first mobile computing device, specific verified attributes to provide to the second mobile computing based on a policy.

12. The method of claim 1 wherein selecting specific verified attributes to provide to the second mobile computing device further comprises:
  selecting, by the first mobile computing device, specific verified attributes to provide to the second mobile computing, in response to a directive received from the first user.

13. A computer implemented method for securely transmitting selected verified attributes between a first mobile computing device having a first user and a second mobile computing device having a second user over a secure channel, the method comprising the steps of:
  receiving, by the second mobile computing device from the first mobile computer device, broadcasted biometric information concerning the first user, the broadcasted biometric information being independently confirmable by visual and/or aural observation of the first user, the broadcasted biometric information having been verified and signed by a verification service separate from the first mobile computing device and the second mobile computing device;
  receiving, by the second mobile computing device from the first mobile computer device, a broadcasted public key of the first user, the broadcasted public key having been signed by the verification service;
  confirming, by the second mobile computing device based on sensor input, the broadcasted biometric information concerning the first user received from the first mobile computing device;
  transmitting, by the second mobile computing device to the first mobile computing device, a request to establish a secure channel for receipt of verified attributes concerning the first user, in response to having confirmed the broadcasted biometric information concerning the first user received from the first mobile computing device;
  generating a session key based on the broadcasted public key, by the second mobile computing device;
  receiving encrypted verified attributes concerning the first user, by the second mobile computing device from the first mobile computing device, the received verified attributes having been selected by the first mobile computing device to provide to the second mobile computing device, from a set of available verified attributes concerning the first user, the selected verified attributes further comprising verified attributes of at least one type from a group of types consisting of:
    verified attributes based on current physical location;
    verified attributes based on identity of at least one target recipient;
    verified attributes based on policy specifying terms and conditions according to which to exchange information;
    verified attributes based on a directive received from the first user; and
  decrypting the received encrypted verified attributes using the session key, by the second mobile computing device.

14. The method of claim 13 wherein confirming the broadcasted biometric information concerning the first user received from the first mobile computing device further comprises:
  receiving at least one image of the first user, by the second mobile computing device, from at least one onboard optical and/or aural sensor;
  gleaning biometric information concerning the first user, by the second mobile computing device, from the at least one received image of the first user;
  comparing, by the second mobile computing device, biometric information concerning the first user gleaned from the at least one received image to broadcasted biometric information received from the first mobile computing device; and
  authenticating the first user responsive to biometric information gleaned from the at least one received image matching broadcasted biometric information received from the first mobile computing device.

15. The method of claim 13 wherein confirming the broadcasted biometric information concerning the first user received from the first mobile computing device further comprises:
- taking a photograph of the first user, by the second mobile computing device using an onboard camera;
- gleaning biometric information concerning the first user, by the second mobile computing device, by interpreting the photograph of the first user;
- comparing, by the second mobile computing device, biometric information concerning the first user gleaned from interpreting the photograph to broadcasted biometric information received from the first mobile computing device; and
- authenticating the first user responsive to biometric information gleaned from interpreting the photograph matching broadcasted biometric information received from the first mobile computing device.

16. The method of claim 13 wherein receiving biometric information concerning the first user that is discernable by visual and/or aural observation further comprises:
- receiving biometric information concerning the first user's physical appearance.

17. The method of claim 13 wherein receiving biometric information concerning the first user that is discernable by visual and/or aural observation further comprises:
- receiving biometric information concerning the first user's voice.

18. The method of claim 13 wherein receiving biometric information concerning the first user and receiving the public key of the first user further comprises:
- automatically detecting, by the second mobile computing device based on sensor input, that the second user is engaged in an interaction with at least the first user; and
- in response, monitoring, by the second mobile computing device, for a broadcast of the first user's signed verified biometric information and signed public key.

19. The method of claim 13 wherein generating a session key, by the second mobile computing device, further comprises:
- generating a random number, by the second mobile computing device;
- using the random number to generate a unique session key, by the second mobile computing device;
- encrypting the random number with the first user's public key, by second mobile computing device; and
- transmitting the encrypted random number to the first mobile computing device, by second mobile computing device.

20. The method of claim 13 wherein generating a session key, by the second mobile computing device, further comprises:
- using Diffie-Hellman key exchange.

* * * * *